United States Patent [19]

Parmann

[11] 4,097,573
[45] Jun. 27, 1978

[54] METHOD FOR BENDING THERMOPLASTIC PIPES

[75] Inventor: Gunnar Parmann, Mathopen, Norway

[73] Assignee: Rieber & Son A/S, Bergen, Norway

[21] Appl. No.: 717,674

[22] Filed: Aug. 25, 1976

Related U.S. Application Data

[60] Continuation of Ser. No. 547,371, Feb. 6, 1975, abandoned, which is a division of Ser. No. 321,028, Jan. 4, 1973, Pat. No. 3,884,612.

[30] Foreign Application Priority Data

Jan. 12, 1972  Norway .................................. 48/72

[51] Int. Cl.² ............................................. B29C 17/02
[52] U.S. Cl. .................................. 264/322; 264/339; 432/253
[58] Field of Search ................. 264/322, 295, 339; 432/255

[56] References Cited

U.S. PATENT DOCUMENTS 2,433,055  12/1947  Linden .................................. 432/255

FOREIGN PATENT DOCUMENTS 1,265,972  4/1968  Germany ............................. 264/295
935,560  8/1963  United Kingdom ................. 264/339

Primary Examiner—Thomas P. Pavelko
Attorney, Agent, or Firm—Kenyon & Kenyon, Reilly, Carr & Chapin

[57] ABSTRACT

Method of bending thermoplastic pipes involving applying a source of heat to those portions of the pipe which are to be fashioned or shaped, applying a bending force to the pipe and cooling the bent pipe. The steps of the method are undertaken at one and the same location while the pipe is internally supported and has one end secured in a fixed position. Apparatus specifically designed to carry out such a method is also included.

11 Claims, 6 Drawing Figures

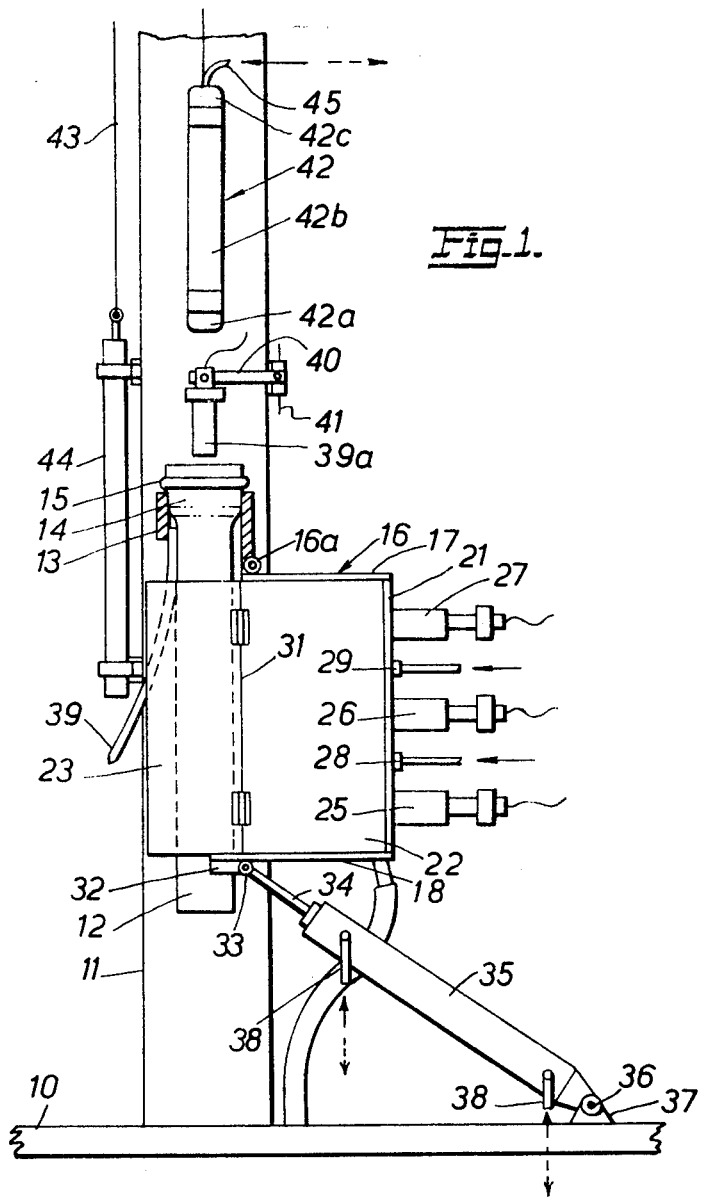

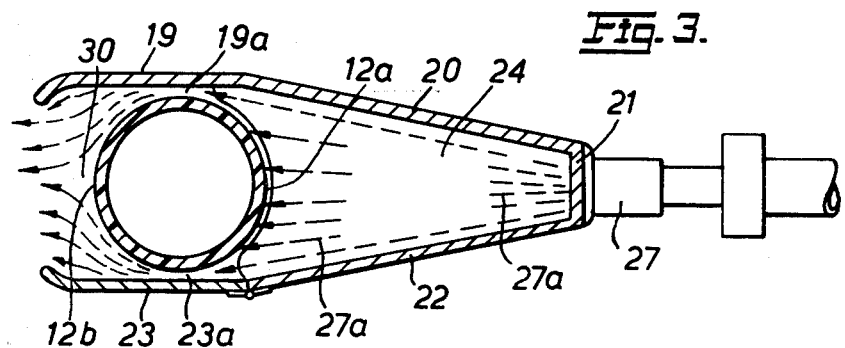
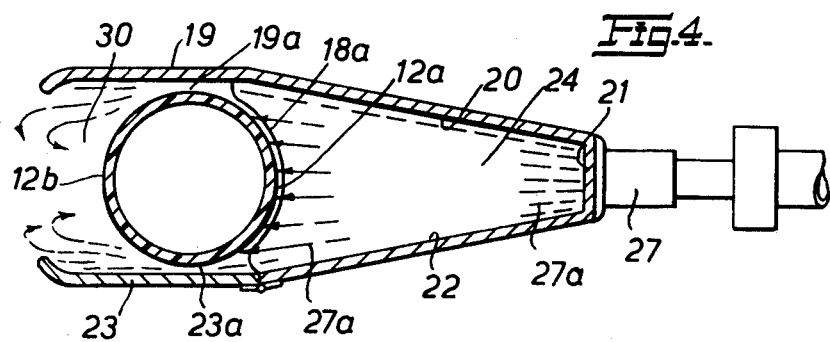
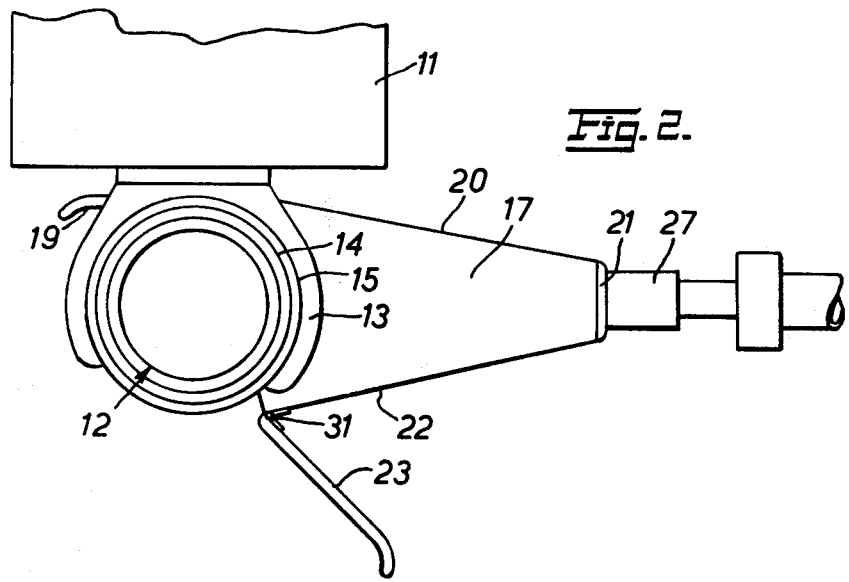

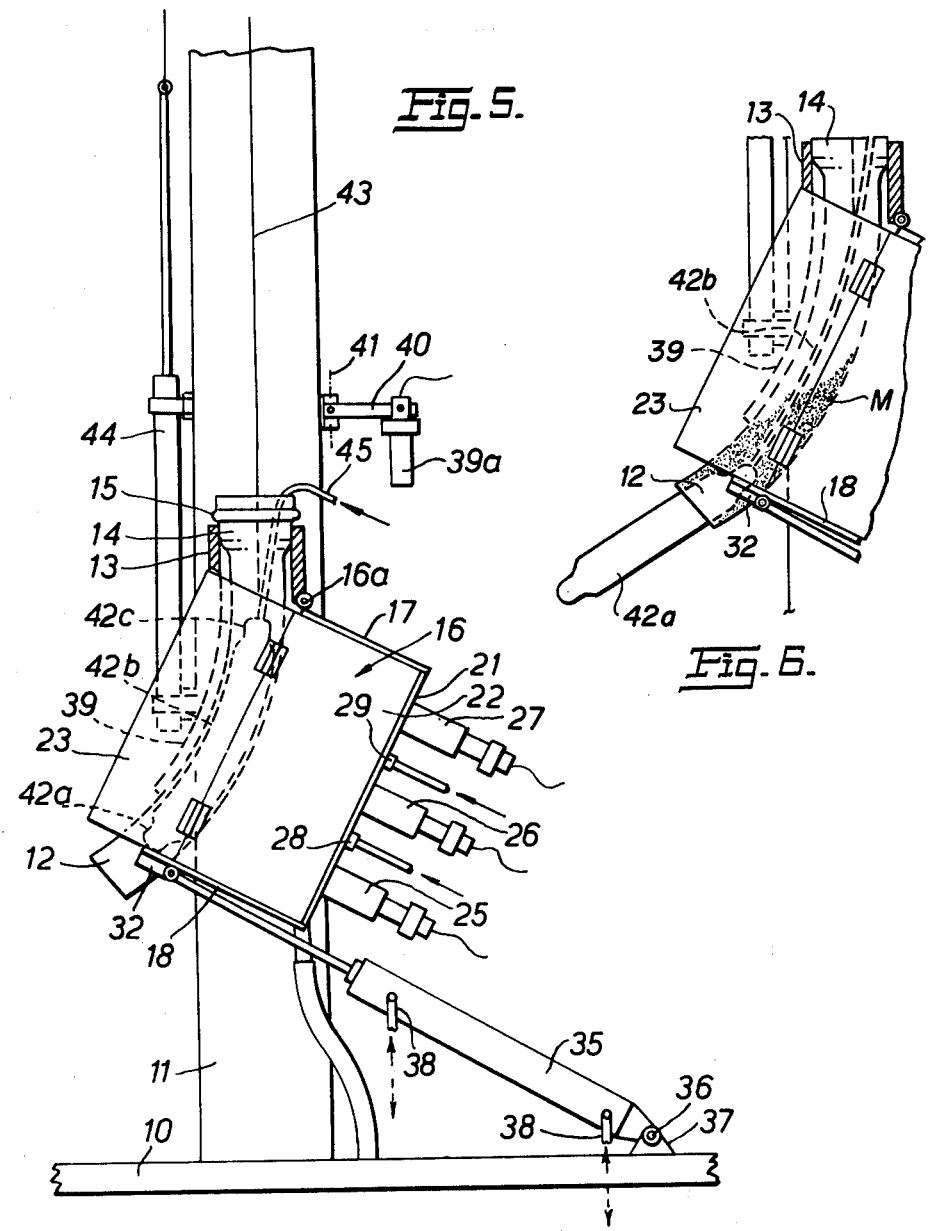

METHOD FOR BENDING THERMOPLASTIC PIPES

This is a continuation of application Ser. No. 547,371 filed Feb. 6, 1975 abandoned, which is a division of Ser. No. 321,028 filed Jan. 4, 1973 now U.S. Pat. No. 3,884,612.

This invention relates to a method of bending thermoplastic pipes by subjecting the pipe to bending forces in a heated condition in order, thereafter, to cool down the pipe into a finished bent condition, as well as to apparatus which can be used to achieve this purpose.

With all pure bending of pipes, there generally occurs a distribution of stress with a tensile stress on the one side portion which is to be fashioned with the largest radius of curvature, that is to say having a convex curvature (stretch side), and with a compressive stress on the other side portion which is to be fashioned with the least radius of curvature, that is to say having a concave curvature (compression side). Generally, the tensile stresses have a tendency to flatten out the pipe on the convex side portion, while the compressive stresses have a tendency to produce local inward and outward bulging, that is to say corrugating or folding on the concave side portion.

In order to be able to deform a thermoplastic pipe to a desired bent shape, it is necessary that the pipe be heated to a suitable shaping or fashioning temperature. However, as a result of the heating, the durability of shape of the pipe is reduced since the annular rigidity and ability of the cross-section of the pipe to absorb compressive stresses is significantly reduced. It is necessary, therefore, during the heating of thermoplastic pipes to carry out extra measures so as to avoid folding together of the cross-section of the pipe and so as to preclude the compressive forces from producing corrugations or folds when the pipe, in the heated condition, is subjected to bending stresses.

Hitherto, it has been usual to effect bending of thermoplastic pipes in several distinct operations. In a first operation, the pipe is filled with a filling composition which has often been preheated so that at the same time the pipe obtains a desired internal reinforcement by the filling composition, there is also obtained a desired preheating of the inner side of the pipe. In a subsequent second operation the pipe, which is filled with filling composition, is heated uniformly, in a suitable heating apparatus, from the external side along the whole of the region of the pipe which is to be bent. In a third operation, the pipe is transferred to a bending jig, where it is bent against an external mould. During the bending, it has hitherto been necessary to have a constant visual control and modification of the bending operation, for example, local after-heating of the pipe in order to avoid corrugations or folds on the compression side and contraction of the pipe cross-section on the stretch side. When the pipe has received the desired bending, the pipe is cooled in a cautious manner, for example, by means of wet filler or the like so as to be disposed later in a water bath for further cooling.

The hitherto employed methods for bending thermoplastic pipes have been relatively expensive to carry out, the bending being both time- and labor-consuming as a consequence of performing the manufacture in several separate working operations with the necessary vigilance and modification of the beanding operation in each instance so that automatic manufacture has been more or less impossible to carry out. In the bending of large and heavy pipe dimensions, the manufacture has been especially clumsy and uneconomic. When extra filling composition is utilized, there have occurred big problems in being able to support the pipe in a satisfactory manner on transferring the heated pipe from the heating apparatus to the bending apparatus. This applies in particular to large pipes having a diameter of from 225 mm and above.

It is an object of the present invention to provide a method and apparatus for bending thermoplastic pipes in which treatment of the pipe before, during and after the bending operation can be carried out in a convenient and simple manner and to a large degree automatically.

According to the present invention a method of bending thermoplastic pipes comprises the steps of (a) applying a source of heat to those portions of the pipe which are to be fashioned, (b) applying a bending force to said pipe and (c) cooling the fashioned pipe, steps (a), (b) and (c) being carried out at one and the same location while the pipe is internally supported and one end thereof is held in a fixed position.

Also according to the invention is apparatus for bending thermoplastic pipes capable of functioning as a self-contained unit and comprising (a) heat-transfer means for controllably heating and cooling such a pipe, (b) means for locating one end of the pipe in a fixed position externally of said heat-transfer means, and (c) means for internally reinforcing the pipe and means for applying a bending force thereto while said pipe is received in said heat-transfer means with said one end in said fixed position, the heat-transfer means being adapted to pivot as the pipe is being bent by actuation of the bending force-applying means.

It has been found to be especially convenient to supply the greatest amount of heat to that section of the periphery of the pipe to be stretched to the maximum and to supply a smaller amount of heat to that section of the periphery of the pipe to be stretched, if at all, to the minimum.

The heat-transfer means can suitably be in the form of a jacket of substantially U-shaped cross-section adapted to surround, while spaced from, the pipe to form internal heat-transfer medium-conveying or guide surfaces with nozzles fixed at the base of the U-shaped for supplying heat-transfer medium to be directed at the pipe and to be led or guided by said surfaces to effect the controlled heating and cooling of the pipe. In a preferred construction, the heat-transfer medium-conveying surfaces define with the pipe narrow gaps at a transition zone intermediate one side portion of the pipe facing the nozzles and another side portion facing away from the nozzles, said internal surfaces projecting freely outwards a distance beyond said another side portion to form a whirl chamber immediately adjacent the latter.

The means for locating one end of the pipe can constitute a holder to which the upper end of the pipe can be secured and from which said pipe can then be freely suspended downwards substantially vertically. Conveniently, the holder can be fixed to an upstanding support column with the heat-transfer means pivotally mounted on said holder below the upper end of the pipe. Desirably, an abutment member of preselected curvature is mounted on the holder and serves as a stop for one side portion of the pipe during bending thereof. The apparatus may also include means for applying direct heat to the internal walls of the pipe pivotally mounted on the support column above the holder thereby enabling said means to be swung away from the pipe when not in use.

The means for internally reinforcing the pipe can comprise means for closing off the freely suspended pipe by insertion in the lower end thereof plus filler material, if desired pre-heated, deposited in the closed-off pipe.

Alternatively, the means for internally reinforcing the pipe can comprise an inflatable container, optionally weight-loaded, adapted to be lowered into the pipe and to be inflated to a pressure sufficient to cause said container to abut the pipe so as to provide a reinforcement therefor while suspended therein and means for lowering and raising said container into and out of the pipe when said container is in its normal deflated condition.

By firmly holding the one end of the pipe during heating, bending and cooling, several advantages can be obtained. One of these advantages is that the manufacture can be effected in a continuous process, that is to say without dividing up into the hitherto employed, separate working operations and without having to transfer from apparatus to apparatus. Another advantage is that by so locating the one end of the pipe, there can be ensured a better controlled and more precisely performable manufacture, with the possibility for automatic operation and consistent action on subsequent pipes during the manufacture. For one thing, one can act on the pipe with respect to a desired stress and/or compression loading.

In order to effect the heating or cooling down with a gaseous medium — or if desired a combination of gaseous or liquid medium — there is the possibility of quite simply regulating the flow conditions of the medium or media so as to achieve a desired differential heating of the two opposite sides of the pipe, that is to say the stretch side and the compression side. By directing the medium in the form of a jet directly against the stretch side of the pipe, there can be obtained an especially intense heating effect on this portion of the side of the pipe. By further regulating the speed of flow of the jet and the heat content and/or by a suitable arrangement of the shape of the guide surfaces projecting freely outwards a distance beyond the pipe, there can be achieved a desirably controlled heating, not only of the stretch side of the pipe, but also of the compression side of the pipe. The heating of the compression side of the pipe can be regulated more or less independently of the heating of the stretch side of the pipe by regulating the speed of flow of the jet of medium. By utilising a low speed of flow, one can, for example, allow the flow of medium to follow the periphery of the pipe from the stretch side to the compression side so that there can be obtained a relatively uniform heating of the two opposite side portions. By utilizing a higher flow rate, one can allow the flow of medium to follow externally arranged guide surfaces so shaped as to lead, thereby, the gas medium positively away from the other side portion (the compression side) so that the latter is correspondingly less heated. A specially adjusted heating effect can be obtained on the compression side of the pipe, by producing a desirably strong whirling effect in the region outside the said other side portion of the pipe (compression side). The heating can, for example, be arranged so that the temperature on the stretch side-forming side portion lies in a region of from above 150° to 200° C, while the temperature on the oppositely disposed side portion lies in a region of from 100° up to 150° C. Immediately the pipe is finally formed, the heat content of the flow of medium can be regulated in a suitable manner from a high heat level to a suitably low heat level, with the corresponding possibility of adjusting the flow conditions at the two opposite side portions according to desire and need.

The described method of heating makes it possible to achieve temperatures in the pipe portions to be bent which correspond to the desired elongations, as the side portions which are to be stretched most are heated to the highest temperature and the side portions of the opposite side are heated to the lower temperature.

The method of heating makes it possible to obtain a sufficient rigidity on the pipe side portion which is to be formed with a concave curvature, to withstand bulging and buckling as a result of the compressive stresses occurring during bending.

In certain circumstances, especially as regards thin-walled thermoplastic pipes or pipes of thermoplastic materials which are little suited to absorbing compression forces without bulging or buckling, one can, in a simple manner, as a consequence of the one pipe end being secured, allow the compression forces which would otherwise occur in the pipe, to be overlapped by a tensile force. It is preferred, in this connection, that the pipe be suspended substantially vertically, preferably in a free downwardly hanging position, secured at the upper end of the pipe so that the weight of the pipe and a possible extra weight loading (or tensile loading) on the latter, exerts a tensile loading which overlaps the compressive stresses otherwise occurring on bending on the pipe side portion which is to be formed with a concave curvature.

In order that the invention can be more clearly understood, convenient embodiments thereof will now be described, by way of example, with reference to the accompanying drawings in which:

FIG. 1 is a vertical elevation of the apparatus according to the invention illustrated in a starting position of the bending process, FIG. 2 is a plan of portions of the apparatus of FIG. 1.

FIG. 3 and 4 are horizontal sections of portions of the apparatus illustrating various flow conditions.

FIG. 5 is a vertical elevation of the apparatus of FIG. 1 after the bending process is concluded, and FIG. 6 is a fragmentary view of an inflatable container in the lower end of a pipe being processed in the heat chamber of the apparatus according to the invention.

Referring to the drawings, there is shown a pipe bending apparatus comprising a horizontal support-forming foot plate 10 and a vertical support column 11 for supporting the pipe 12 which is to be bent, in a vertical downwardly hanging starting position. At a suitable height above the foot plate 10, there is fixed a sleeve-shaped pipe holder 13 which is adapted to form an abutment against portions of the upper socket portion 14 of the pipe and with its upper edge 13a an abutment for an annular collar 15 of the pipe socket portion 14. The pipe holder 13 is obliquely cut underneath at 13b to permit the bending of the pipe 12 from the position illustrated in FIG. 1 to the position illustrated in FIG. 5. The pipe holder 13 is readily displaceable so as to be able to be adapted to various desired pipe dimensions which are to be bent.

To the respective lower edges of the pipe holder, there is secured a heat chamber 16 pivotably mounted about a horizontal axis 16a at right angles to the plane of the drawing in FIG. 1. The chamber 16 is provided with a horizontal top member 17 which defines a seat for the pipe 12 and a horizontal bottom member 13 which defines a seat for the pipe 12. The chamber 16 also has vertical side members 19-23 to define a U-shaped jacket. From the central side member 21 (see FIG. 2-4), there diverge obliquely outwards in opposite directions, the side members 20 and 22 towards two side members 19 and 23. The lower end of the pipe 12 is received in a concave cavity 18a in the shaped end of the bottom member 18 of the chamber 16 while the upper end of the pipe is arranged in a corresponding cavity in the inlet shaped end of the top member 17 without contacting the latter. Laterally there are formed relatively narrow gaps 19a and 23a between the pipe 12 and the side members 19 and 23. There is formed a chamber 24 between the side members 20, 21, 22, the top member 17, the bottom member 18 and portions of the side members 19, 23 together with the one side 12a of the pipe 12.

Directly opposite the side 12a of the pipe, means are fixed in the side member 21 for directing at least one flow of heated air transversely onto and around the pipe. This means includes three compressed air nozzles 25, 26, 27 at a suitable height above each other and in the intermediate spaces between the latter two, means for directing at least one flow of water transversely of the pipe are used. These latter means include pressure water nozzles 28, 29. It will be understood that it is possible to arrange less or more nozzles if required. The nozzles 25-27 are adapted to be able to supply compressed air having an individually regulatable pressure and/or individually regulatable heat content. If desired, there can be added steam or water directly to the pressure forces. Similarly the pressure water nozzles 28, 29 can be supplied with hot or cold water as required. The water is preferably added compressed air to give a wanted water spray. The nozzles 25-27 and 28, 29 are adapted to blow substantially conical jets of pressure medium as illustrated by the jet lines 27a in FIGS. 3 and 4, having direct impact against the one side 12a of the pipe which is to be subjected to an especially intense heating and cooling.

The pressure medium flows from the chamber 24 further past the pipe in the gaps 19a and 23a between the pipe 12 and the side members 19 and 23 and is conveyed further outwards by means of the side members 19 and 23 which are extended a distance past the outwardly directed side portion 12b of the pipe 12. In the region between the side members 19 and 23 outside the side of the pipe 12b there is formed a whirl chamber 30 having an opening to the open air for exhausting the heated air flow passing away from the pipe.

When working with pipes of large diameter, it has proved necesssary to arrange the guide surface-forming side members 19 and 23 so that they converge somewhat thereby limiting the whirl chamber, at the side portion 12b of the pipe, to a relatively narrow belt reckoned in the longitudinal direction of the pipe.

The whirl effect in the chamber 30 is dependant upon the rate of flow of the pressure medium and the shape of the side members 19 and 23, and by regulating the pressure of the pressure medium and/or the shape of the side members 19 and 23, the whirl effect can be regulated as required and thereby the discharging of the pressure medium along the side 12b of the pipe can be regulated. By suitable simultaneous regulation of the pressure and heat content of the pressure medium, there can be achieved, as required, smaller or larger temperature differences on the opposite side portions 12a and 12b of the pipe 12. For example, the pipe side portion 12a can be heated to a temperature of from above 150° up to 200° C while the pipe side portion 12b can be heated to a temperature of from 100° up to 150° C.

As is evident from FIG. 2, the pipe holder 13 is substantially C-shaped in horizontal section with the opening of the C-shape direction outwards from the plane of the drawing in FIG. 1 so that the pipe 12 can be arranged readily in place sideways in the pipe holder. In order to be able to arrange the pipe simultaneously sideways in place in the chamber 16, the side member 23 is, as illustrated in FIG. 2, pivotable about a vertical axis 31 relatively to the adjacent side member 22.

To the bottom member 18 of the chamber 16, there is secured a pipe support member 32. Via a pin 33, the chamber 16 is linkably connected to a piston rod 34 of a compressed air cylinder 35, the opposite end of which is pivotably mounted on a pin 36 in a bracket 37 fixed to the foot plate 10. At 38, there are indicated conduits for the pressure medium which is to displace the piston rod between the positions illustrated in FIG. 1 and 5.

To the side portion of the pipe holder directly above the horizontal pivotal axis of the chamber 16, there is secured a bent pipe support rail 39 having a curvature which forms a stop for the side 12b of the pipe and ensures that the latter obtains a desired degree of angle as illustrated in FIG. 5.

In the embodiment as illustrated in the drawings, hot air is supplied internally to the pipe 12 by arranging a compressed air nozzle 39a with hot air, of an air drying apparatus or a similar combined blowing and heating apparatus, just above the upper end of the pipe as shown in FIG. 1. The compressed air nozzle is secured to a support arm 40 which is pivotable about a vertical axis 41 on the column 11 so that the compressed air nozzle 39a or the like can be swung to the side as shown in FIG. 5, as required.

A separate rubber container 42 is adapted to be lowered by way of a support line 43 and a compressed air cylinder 44 into place in the pipe 12. In the illustrated embodiment, the support line extends in a U-shaped path from the compressed air cylinder 44 via gear means (not shown) to a fastening on the rubber container 42. The rubber container comprises a reinforced bottom portion 42a, a radially expandable sleeve portion 42b and a reinforced top portion 42c which is provided with a compressed air conduit 45. After the rubber container is lowered into place in the heated pipe 12, the rubber container is blown up to a suitable pressure so that it forms an internal abutment against the pipe and reinforces the latter in a desired manner. Immediately the pipe is finally bent, and cooled, the compressed air is let out of the rubber container 42 and the rubber container can be drawn up again from the pipe and brought into place in the position which is shown in FIG. 1.

Instead of the illustrated compressed air nozzle 39a and the rubber container 42, there can be utilized another form of internal reinforcement of the pipe 12. There can be utilized, for example, a rubber container which is introduced from the lower end of the pipe a suitable distance into the pipe to a level below that portion of the pipe which is to be bent. The container can be radially stretched by means of compressed air to seal off the lower end of the pipe. After this it can be filled with sand, gravel, metal balls (steel shot) or similar filling material in suitable quantities. The filling material M used can in a manner known per se be preheated before it is introduced in the pipe and can impart a suitable quantity of heat to the inner side of the pipe in advance, as well as during, the whole of the bending process, that is to say up to the rubber container is removed from the pipe and the filling material thereby discharged.

In an instance where the rubber container 42 is used for the internal reinforcement of the pipe, a desired relatively tensile effect can be obtained during bending, produced substantially by the weight of the pipe as a result of the pipe being suspended in a vertical position with support at its upper end. A certain increase of the tensile leading can be achieved by weight loading the rubber container in a suitable manner. On the other hand by using sand, gravel, metal balls or similar material having a relatively large specific gravity, as combined filling material and weight loading, there can be obtained a desired, especially strong, tensile loading in the pipe.

A strong tensile loading can be advantageous for, for example, thin-walled plastic pipes (which have a small wall thickness and thereby also a relatively small tensile effect as a result of small weight) or plastic pipes of material which is difficult to shape. By overlapping the compressive stresses, which would otherwise occur on that side of the pipe which is to be fashioned with a concave curvature, with tensile stresses, the folding effects can be avoided which otherwise have a tendency to occur on this side portion of the pipe. On the opposite side portion the filling material, and the reinforcing rubber container, will prevent the tensile stresses occurring during the bending together with the tensile stresses which are produced by the extra weight loading, from producing folding together of the pipe cross-section.

MODE OF OPERATION

After a pipe 12 is pushed laterally into place in the pipe holder 13 and the chamber 16, and after the side member 23 of the chamber is swung into place from the position illustrated in FIG. 2 to the position illustrated in FIG. 1, the pipe 12 is heated internally by a hot compressed air stream which is supplied from the compressed air nozzle 39a. After a suitable time interval, the compressed air supply to the compressed air nozzle 39a is closed off and the latter is swung to the side as shown in FIG. 5. The rubber container 42 is thereafter lowered into place in the pipe, blown up with compressed air to a suitable pressure so that there is exerted a definite, moderate pressure against the inner walls of the pipe. After this hot compressed air is supplied via the nozzles 25-27 to the chamber 24 with the jets blown more or less at right angles against the portion 12a of the side of the pipe which is to be fashioned or shaped with the strongest convex curvature, the jets being deflected laterally along the periphery of the pipe and flowing outwards through the gaps 19a and 23a between the chamber 16 and the pipe and being conveyed further as a boundry layer outwards along the guide surface-forming side members 19 and 23, past the pipe 12. To begin with, there can be utilized a lower pressure on the hot air jets so that the hot air stream flows more or less uniformly along the whole of the periphery of the pipe as illustrated in FIG. 3, thereby resulting in a preliminary uniform heating of the whole of the periphery of the pipe. To achieve a uniform overlap between the not heated parts of the pipe and the parts to be heated the nozzles 25 and 27 can be adjusted to a lower temperature than the nozzle inbetween. Gradually there can be obtained a more intense heating of the side 12a of the pipe which is to be subjected to the greatest bending, by increasing the pressure of the hot air jet. Such a pressure increase involves increasing the rate of flow of the hot air stream against the side portion 12a and through the gaps 19a and 23a and thereby forcing the boundry layer flow of hot air in a direction outwards from the outwardly directed side portion 12b of the pipe along the guide surface-forming side members 19 and 23 so that there is formed an increased whirl effect in the chamber 30 as indicated in FIG. 4, and a lower heating of the side portion 12b of the pipe than the side portion 12a thereof. During the heating period or after the pipe has obtained the wanted temperatures, the bending is performed with the assistance of the compressed air cylinder.

Immediately the pipe is finally bent to a desired angle with abutment against a desired length of the pipe support rail 39, the cooling of the pipe can be preceeded with. This can be effected gradually and in an accurate adjusted manner, by utilizing suitably tempered cold air streams instead of the previously utilized hot air streams or by cooling down the hot air streams by the addition of cold water through separate fine distribution nozzles or, if desired, by the addition of cold water directly to the cold air streams. Finally, the cooling can be effected exclusively by a flow of cold water directly impacting the side surface 12a of the pipe and adjusted so that the cold water is conveyed over to, and also effectively cools, the side surface of the pipe.

Conveniently, the water which is used in the cooling operation can be collected at the bottom of the jacket 16 and led away from the latter via a pipe.

After the effected cooling the chamber is withdrawn and the bent pipes can be stored directly or, if desired, put aside for further cooling in air before being stored.

In order to prevent the concave side of the pipe 12 from curling during the bending operation, the results of practical tests would seem to suggest that if heating is carried out in the bending zone in a more or less arbitrary fashion, the compression stresses to which the concave side is subjected will be at a minimum provided that the pipe is exposed to an additional tensile stress. Alternatively, heating the pipe in the controlled manner described in the above embodiments, that is to say by subjecting the convex side to the maximum and the concave side to the minimum heat, leads to a stiffening or bracing of the concave side without extra tensile stresses having to be utilised. As a practical matter, both approaches can be easily combined to a lesser or greater degree. It will be appreciated, however, that conditions may vary somewhat all according to the choice of wall thickness, diameter and material for the pipe.

Even if it is not shown in detail in the specification and drawings, it will be understood that the heating, bending and cooling of the bent pipe can be carried out by an automatically controlled process by employing suitable control means known per se, and that several bending apparatus can be coupled together and operated simultaneously.

What I claim:
1. A method of bending thermoplastic pipe comprising the steps of
    locating one end of the pipe in a fixed position,
    blowing a flow of heat-transfer medium from only one side of the pipe onto and around a circumferential surface of a portion of the pipe spaced from said end to heat a first peripheral pipe section facing said flow while guiding the heat transfer medium towards an opposite peripheral pipe section to heat said opposite peripheral pipe section to a lesser extent than said first section, internally reinforcing said heated portion of the pipe during heating with a removable reinforcing means, and bending said heated portion of the pipe.

2. A method as set forth in claim 1 wherein the speed of the flow of heat-transfer medium is regulated to obtain a corresponding heat transfer effect on the bent pipe portion.

3. A method as set forth in claim 1 wherein the pipe is initially suspended from said fixed position.

4. A method of bending thermoplastic pipes comprising the steps of introducing a thermoplastic pipe into a heat transfer means and simultaneously engaging one end of said pipe with a locating means in a fixed position externally of the heat transfer means, actuating the heat transfer means to blow a heat transfer medium from only one side of the pipe onto and around the pipe to heat a circumferential surface of the pipe in a controlled manner in which the greatest amount of heat is supplied to a first peripheral section of the pipe while a lesser amount of heat is supplied to the opposite peripheral section by guiding the heat transfer medium towards said opposite peripheral section, introducing a means into the pipe for internally reinforcing the pipe during heating thereof, thereafter applying a bending force on the pipe while maintaining the controlled heating of the pipe, and subsequently cooling the pipe in a controlled manner after bending of the pipe is concluded.

5. The method accoding to claim 4 which comprises introducing the pipe into the heat-transfer medium in a preheated condition.

6. The method according to claim 4 which comprises actuating means for applying direct heat to the internal walls of the pipe prior to introducing the means for internally reinforcing the pipe.

7. The method according to claim 4 which comprises applying direct heat to the internal walls of the pipe by way of the means for internally reinforcing the pipe.

8. A method of bending thermoplastic pipes comprising the steps of introducing a thermoplastic pipe into a heat transfer means and simultaneously engaging at least one end of said pipe with a locating means in a fixed position externally of the heat transfer means, introducing a means into the pipe for internally reinforcing the pipe, blowing a heat transfer medium from only one side of the pipe initially as a pressurized flow against a circumferential surface of a portion of the pipe to effect a preliminary uniform heating of said circumferential surface and thereafter increasing the pressure of the heating medium to heat a first section of the periphery of the pipe within the heat transfer means to a maximum extent while causing a boundary layer of the flowing medium to be displaced at a location on the periphery of the pipe between said first section and a second section of the periphery of the pipe to thus cause an enhanced whirl effect immediately adjacent said second section whereby said second section is heated to a lesser extent than said first section, thereafter applying a bending force on the pipe, and subsequently cooling the pipe after bending of the pipe is concluded.

9. A method as set forth in claim 8 which further comprises the step of causing the heat transfer medium to flow in a stream towards the pipe between two opposite guide surfaces in a direction substantially perpendicular to the longitudinal axis of the pipe, and to effect a whirl at said second section of the periphery of the pipe due to the guide surfaces projecting beyond the pipe.

10. The method according to claim 8 which comprises beating the peripheral section to be stretched to the maximum extent to form above 150° up to 200° C and heating the peripheral section to be stretched to the minimum extent to a temperature of from 100° up to 150° C.

11. A method of bending a thermoplastic pipe comprising the steps of locating one end of the pipe in a fixed position, introducing a means into the pipe for internally reinforcing the pipe, blowing a flow of heat transfer medium from only one side of the pipe onto and around a circumferential surface of a portion of the pipe spaced from said end to heat said portion in a controlled manner in which the greatest amount of heat is supplied to a first peripheral section of the pipe to be stretched to a maximum extent while guiding a part of said flow about the pipe to supply a lesser amount of heat to the opposite peripheral section of the pipe, thereafter applying a bending force on the pipe to bend the heated circumferential portion thereof, and subsequently cooling the pipe.

* * * * *

UNITED STATES PATENT AND TRADEMARK OFFICE
CERTIFICATE OF CORRECTION

PATENT NO. : 4,097,573
DATED : June 27, 1978
INVENTOR(S) : Gunnar Parmann

It is certified that error appears in the above-identified patent and that said Letters Patent are hereby corrected as shown below:

Column 1, line 67, change "beanding" to --bending--

Column 2, line 45, change "U-shaped" to --U-shape--

Column 4, line 41, change "." to --,--

Column 4, line 43, change "." to --,--

Column 5, line 3, change "13" to --18--

Column 8, line 20, change "preceeded" to --proceeded--

Column 10, line 31, change "form" to --from--

Signed and Sealed this

Twenty-seventh Day of February 1979

[SEAL]

Attest:

RUTH C. MASON
Attesting Officer

DONALD W. BANNER
Commissioner of Patents and Trademarks